3,305,519
FRICTION ELEMENTS AND METHODS OF MAKING THE SAME
Sumner B. Twiss and Edward J. Sydor, Grosse Ile, Mich., assignors to Chrysler Corporation, Highland Park, Mich., a corporation of Delaware
No Drawing. Filed Nov. 6, 1961, Ser. No. 150,181
1 Claim. (Cl. 260—41.5)

The present application is a continuation-in-part of our copending application Serial No. 811,764, filed May 7, 1959, which is a continuation-in-part of our application Serial No. 517,274, now Patent No. 3,007,890, filed June 22, 1955, now abandoned.

This invention relates to friction elements such as brake linings and a process for making the same. More particularly it concerns a unique process for producing friction elements utilizing synthetic rubber binders of the NBR and GR-S types and curing them by an oxidation treatment to a substantially insoluble and infusible state without vulcanizing or costly press curing and without resorting to curative agents such as sulfur or peroxide to effect cross linking of the rubber molecules.

In said copending application we have described and claimed novel friction elements consisting essentially of a major portion by weight of particles comprising friction material, the greater portion by weight of which is filamentous material and a minor but substantial portion of a binder consisting essentially of a high gel in situ cured synthetic butadiene acrylonitrile copolymer. We have there also made appearent that vulcanizing and press cures and curative agents, especially peroxide or sulfur in elemental or in sulfur-donor material form or such agents and an accelerator combined therewith, are not required as universally believed to effect a cure where synthetic rubbers are employed as binders but that unpressed friction elements may be made utilizing binders of high gel type butadiene acrylonitrile copolymers and cured by oxidizing procedures without the need for sulfur or peroxide cross-linking agents. It has also been there noted that where sulfur is present in the friction element composition for vulcanizing purposes and not merely as a non-donor filler that any uncombined reactable sulfur may continue curing of the element and produce a burnt brittle product when the element is subjected to heat and pressure produced during braking operations on a wheel. Moreover, that where such curative sulfur is present in the linings it contributes to burning of the braking surface after repeated hard stops of a vehicle employing the same.

We have now discovered that friction elements of a useful character and producing excellent brake linings may not only be made in the absence of sulfur and peroxide, and of compositions employing high gel butadiene acrylonitrile binders described in said copending application (which compositions are by this cross reference incorporated herein and made a part hereof) and in accordance with cure procedures there described but that friction elements may be formulated utilizing synthetic rubber binders, specifically any of the crumb, slab or liquid butadiene styrene copolymers known in the trade as GR-S rubbers (both hot and cold polymerized types) and any of the crumb, slab or liquid butadiene acrylonitrile copolymers of the types known as Buna N or NBR rubbers (not limited to the high gel types) or combinations thereof as the primary binder where the proper oxidation process is applied to them to effect the cure.

Accordingly the main object of the invention is to produce friction elements of the type described in said copending application aforesaid employing high gel Buna N rubber primary binders and to make similar elements utilizing other synthetic Buna N or GS-R rubber binders as the primary binder, wherein in each instance the mechanism of cure is primarily and preferably solely one of oxidation promoted by a heated oxidizing atmosphere.

Another object is to provide a process for producing friction elements which comprises making uncured linings of compositions such as described in said copending application and in which a synthetic rubber such as a GR-S or Buna N rubber is used as the primary binder and in which no sulfur, peroxide or sulfur-donor curing agents and accelerator ingredients combined therewith are included for effecting a cure and wherein said elements are cured substantially wholly by oxidation promoted by a heated oxidizing atmosphere.

Other objects and advantages of the invention will be apparent from the following description.

In accordance with the present invention the compositions of the friction elements may be cured without the presence of elemental sulfur, sulfur-donor curatives, peroxide type curatives, antioxidants and without associated accelerators for the curatives. Moreover, the press cure usually essential for compositions requiring a vulcanized cure is completely eliminated. The curing mechanism is primarily and preferably solely one of oxidation promoted by a heated oxidizing atmosphere. In this connection it may be noted that although the aforesaid curative ingredients are not essential to curing friction elements by the present invention and are preferably not used, they may nevertheless be present in the composition since generally they will not be required for cure in the oxidizing process here employed. However, under certain conditions they may contribute to curing and where such is the case they should not be used in amounts that will produce a predominance of cross-linking of the rubber molecules by either sulfur cross-linking or cross-linking such as produced by peroxide additives. In any case it is preferred as noted in said copending application that the curative sulfur content be limited to about 10% by weight of the binder.

The cure mechanism of the present invention is essentially the same whether the primary binder of the composition be a GR-S or a Buna N synthetic elastomer. It is, for example, applicable to the high, medium and low gel butadiene acrylonitrile copolymers in their various forms such as Hycar 1411, a finely powdered high acrylonitrile, high Mooney viscosity NBR material substantially insoluble in organic solvents; Hycar 1001, a slab form type, high acrylonitrile NBR copolymer; Hycar 1041, a soluble type high acrylonitrile NBR copolymer; and Hycar 1312, a liquid type medium acrylonitrile NBR copolymer; all made by Goodrich Chemical Company and low, medium or high gel, hot or cold polymerized butadiene-styrene copolymers (GR-S) in crumb, bale or water emulsion (latex) or liquid form such as numbers 1006, 1009, 1012 and 1013, and the bale type 1500, all containing about 20 to 50% bound styrene and all made for example by Goodrich-Gulf Chemical Company or Firestone Rubber Company under these designations.

As stated above, the compositions of the friction elements of the present invention include, as described in said copending Twiss et al. application, in addition to the primary binder certain proportions of friction particles including a predominant amount of filamentous material, all as there described. Being preferably substantially free of the above noted curing agents for the primary rubber binder employed in vulcanizing, any physical or chemical change such as cross-linking in the molecular structure of the rubber molecules of the binder is produced predominantly and preferably solely by an oxidative cure through the use of heated air and/or heated oxygen. In all cases the green friction elements must be uncovered, that is, open to the heated air or oxygen for curing. Hence, many more elements may be advantageously cured in the same space as could single elements in a press by prior vulcanizing processes. For this reason and since costly presses and related steam heating equipment are avoided the cost of the oxidized cure is much less than curing by known procedures. The friction elements when subjected to the heated air or oxygen undergo a hardening transition with a physical and chemical change occurring. For example, in the case of elements in which Hycar 1411 primary binder was used, treating the elements with hot air at 350° F. produced a physical change in the element from a soft plastic state to that of a semi-hard thermoset state and a chemical state in which the binder is rendered substantially insoluble and infusible. The chemical change in the Hycar 1411 rubber molecules is a result of oxidation cross-linking accompanied by the formation of hydroxyl and carbonyl groups. This has been verified by spectra prepared from films of Hycar 1411 binder which when heated in air exhibited both carbonyl and hydroxyl absorption maxima.

The normal processing used to oxidize cure friction elements made with the aforesaid primary binders and preferably in the absence of sulfur type curatives and accelerators is to place the elements or linings in a circulating air oven where the incoming air is preheated to the desired temperature, dependent upon the primary binder used, preferably such that the air temperature does not vary more than about 5° F. throughout. It is essential that the linings be substantially uncovered or stated otherwise that the inner and outer surface of the lining be exposed to the heated air at all times during the cure. The green friction element or lining where of a preformed arcuate self-supporting shape may be held in that shape by suspending or supporting the lining at the ends. Leaving the broad surfaces or faces exposed to the air allows uniform and thorough oxidation of the friction surface and cure of the binder to take place. The air may be conveniently preheated by passing it over electrically heated coils, steam coils, or through a flame. Since the oxidation is an exothermic reaction, the linings should preferably be spaced a sufficient distance from one another to assure that hot air circulated between the linings does not rise above the desired predetermined curing temperature and thereby produce variable cure in the surrounding linings or parts thereof. By preference, the curing is normally carried out in a batch type oven. However, it can also be conducted equally well in a continuous moving carrier oven when the desired curing temperature is maintained throughout the oven.

Oxidation cure is accelerated by higher temperatures. Essentially no oxidation takes place at a temperature of the air or oxygen under about 250° F. to 290° F. and the use of air temperatures above 600° F. are not generally recommended. Usually a temperature of about 350° F. will be found adequate. It is found that for a given porosity a definite relationship exists between time and temperature or stated otherwise the state of cure is a function of time and temperature and a comparable cure can be obtained at different temperatures. For example, approximately the same state of oxidation cure may be obtained by heating an element in circulating air at 350° F. for 20 hours as can be obtained by heating it in circulating air at 450° F. for only 8 hours. Hence by adjusting the temperature of the air in the oven and the time in the oven at that temperature, the state or condition of cure of the binder may be readily controlled to produce a satisfactory friction product.

Moreover, while the described oxidation treatment with air or oxygen is usually at atmospheric pressure and humidity it will be understood that such oxidizing media may be under pressure greater than atmospheric or even under a slight vacuum. The important requirement is that there always be present in the oven an excess of oxidizing medium to assure thorough treatment of the green friction elements. Where the air is under pressure above atmospheric there will be a greater amount of oxygen available for use in the process. On the other hand a slight vacuum condition, for example 1 to 2″ of water makes it possible to inhibit release of oxidation products of the process into the operating area. Extremely high humidity conditions such as highly saturated steam limits the amount of air available for treatment of the elements and hence is not advocated.

By selecting the primary binder and conditions of cure, friction elements in various physical and chemical states are possible. Thus oxidatively cured linings using NBR primary binders will by proper selection of the temperature and time of cure produce a lining of semi-flexibility whereas the oxidatively cured linings using GR–S primary binders will generally be fairly rigid. Although in all cases the binder upon receiving an oxidizing cure will reach a substantially insoluble and infusible thermoset condition productive of satisfactory friction elements, the exact state of the cure will depend somewhat upon the temperature employed and time at that temperature. By increasing the time of exposure at a given temperature or using a higher temperature for a given time, advanced states of cure are possible where for some conditions of use and the characteristics provided it is desirable.

Oxidation cure of elements utilizing NBR and GR–S primary binders yield products at least equivalent to and generally better than those obtainable by conventional sulfur or peroxide curing systems using the same polymers. A particular advantage of the oxidative cure mechanism is that the friction developed by the lining may be raised or lowered nominally by increasing or decreasing the cure. Generally speaking, the greater the cure the lower the coefficient of friction and the lesser the cure the higher the coefficient of friction. Another advantage of the oxidation cure system or mechanism is that the porosity of the linings or friction elements may be adjusted to promote or retard the oxidation reaction on the polymer, thus yielding materials of various wear and degrees of heat resistance.

Where essential, the oxidative cure may be controlled through the use of various amounts of and different types of well known anti-oxidants either supplied in the green polymer or in the compound mix.

The state of cure of the friction elements is also measurable by hardness readings on a ground surface of the freshly cured lining. These hardnesses are usually obtained by a Rockwell hardness machine. For uniformity of testing all readings are taken on a surface of the brake lining approximately .020 inch below the skin of the O.D. on a nominally 0.230 inch thick lining. This is done to minimize the effect of skin hardness and the effect of the hard anvil supporting the lining in the hardness testing machine.

A limitation on the use of hardness in determining the state of oxidative cure is that the porosity of the lining will affect the amount of cure that takes place and will also affect the hardness reading of the sample. The more porous the lining, the more oxidation will take place at any given set of curing conditions; the more porous linings will generally give lower hardness readings than the less porous linings that have undergone the same curing temperature for the same time. Hence, hardness readings where used as a measure of cure should be adjusted for the porosity of the element tested.

The following examples will illustrate the general method of this invention, being embodiments of compositions suitable for making brake linings or clutch facings of automotive vehicles. It will be understood that these examples are not given by way of limitation.

EXAMPLE I

A friction element was prepared using the following ingredients in parts by weight:

High acrylonitrile insoluble butadiene-acrylonitrile
  copolymer, powdered rubber #1411 [1] _____ 15.0
Asbestos 5K _____ 57.8
Zinc oxide (Kadox 15) [2] _____ 2.72
Barytes _____ 12.98
Rottenstone _____ 11.50
Water _____ 2.00
Toluene solvent _____ 20.00

[1] B. F. Goodrich Hycar #1411.
[2] New Jersey Zinc Company Kadox 15.

The Hycar 1411, zinc oxide Kadox 15, barytes, and rottenstone were sized through a 20-mesh screen and added to the 5K asbestos in a Baker-Perkins sigma bladed mixer. These dry ingredients were mixed for one hour at which time the toluene was added and mixed into the batch for 10 additional minutes. The water was then added and the batch mixed for a final 5 minutes.

The wet mix was immediately transferred to an extruder hopper to minimize solvent loss and a tape thereof extruded and cut into suitable lengths to form friction segments. These were placed in a 190° F. dry out oven for 6½ hours to remove the solvent. The dried green segments were then removed from the oven and allowed to cool. In order to adjust porosity the green segments were next placed in a hydraulic press with platens heated to 290° F. to be densified, and pressed at 250 p.s.i. for one minute followed by a ½-minute breathe cycle with pressure off and a final press made at 500 p.s.i. for 4½ minutes, after which the lining segments were removed and fed through a roll form for curing until a final desired diameter of about 10" was obtained.

After being cut to final width and length the segments were placed in suitable curing frames shaped to permit exposure of the opposite friction faces to treatment. The segments were thus heated in a circulating air oven with the air at 500° F. and circulated over the faces of the segments for 6 hours, after a rise to this temperature of the segments which required about 1½ hours to accomplish.

After cure, the O.D. surface skin of the lining segment was ground off removing about 0.020" of material. Hardness measurements taken on this ground surface average 47.3 Rockwell M scale.

EXAMPLE II

A brake lining was prepared using the following composition in parts by weight:

Low gel butadiene-styrene copolymer soluble bale
  rubber No. 1500 [1] _____ 22.00
5 K asbestos _____ 61.0
Zinc oxide _____ 1.0
Cardolite NC–111 [2] _____ 16.0
Toluene solvent _____ 23.0
Water _____ 2.0

[1] Goodrich-Gulf #1500.
[2] Cardolite NC-111 is an organic resin particulate made by Minnesota Mining and Manufacturing Company. It is prepared by reacting together and heat curing to the infusible state the residue of the distillation of cashew nut shell liquid, furfural and diethyl sulfate, as described in U.S. Patent No. 2,317,587 and then comminuting the infusible mass to a granular material.

All dry ingredients except the GR–S rubber were mixed for 60 minutes in a Baker-Perkins universal mixer. The rubber component was broken on a 16-inch rubber mill for 10 minutes, then cut into small pieces and dissolved in the toluene solvent by shaking 80 minutes in a Red Devil paint shaker to form a cement containing 16% solid.

The cement was added to the dry ingredients in the Baker-Perkins mixer and mixed for 60 minutes. The batch was then dried in an oven at a temperature of between 190 to 210° F. to dry out all the solvent and 23% by weight of the dried batch of toluene again added to the dried material and mixed therewith for 10 minutes to produce a plastic mass. The water was then added and the batch mixed for 5 minutes.

The prepared mass was then placed in a screw type extruder and formed through a die into tape segments about .250" thick. The segments were then dried at 190° F. until less than 0.5% solvent remained in the extruded tape. The tape segments were then densified by pressing under 350 p.s.i. in a hot plate press at 290° F. for 6 minutes and roll formed to arcuate shape, after which they were oxidation cured as in Example I with circulating hot air at 350° F. for 6½ hours after a 1½ hour rise to 350° F.

EXAMPLE III

A friction element was prepared using the following ingredients in parts by weight:

Medium acrylonitrile, liquid type butadiene, acryl-
  onitrile copolymer No. 1312 _____ 20.39
Asbestos 5K _____ 48.97
Zinc oxide (Kadox 15) _____ 5.01
Cardolite NC–111 _____ 25.63
Water _____ 10.00

The dry materials were mixed in a Baker-Perkins universal mixer for 30 minutes. The liquid polymer was then added and mixing continued for 30 minutes, after which the water was added to the mix and mixing continued for 10 minutes. The mixed material was now in a lumpy plastic condition. The batch was placed in a screw type extruder and extruded through a heated curved die, heated at a temperature between 140 to 180° F. and curved elements of about 12" O.D. obtained. These were then oxidation cured as in Example I with circulating hot air at 350° F. for 6½ hours after a 1½ hour rise to 350° F.

In Examples I and II where toluene is given as the solvent, other solvents, both aliphatic and aromatic hydrocarbons such as naptha, gasoline, benzene, methyl ethyl ketone, and other known solvents may be used in substitution therefor or mixture therewith.

We claim:

A method of making friction elements having good friction stability and fade resistance comprising forming a substantially homogeneous wet plastic mixture comprising friction particles predominantly of inorganic fibrous material, in amount between about 78 to 89% by weight of the dry ingredients of the composition, the remainder comprising binder material consisting essentially of uncured synthetic butadiene-styrene copolymer, said mixture being substantially free of peroxide, sulfur and sulfur-donor compounds having a curative effect on said mixture, forming elements of predetermined shape from said mixture, and oxidizing curing the elements with heated air at a temperature above about 290° F. to render said copolymer substantially insoluble and infusible.

References Cited by the Examiner

UNITED STATES PATENTS 2,459,739   1/1949   Groten et al.
2,686,140   8/1954   De Gaugue.
3,007,890   11/1961  Twiss et al. _____ 260—41.5

OTHER REFERENCES

Barron "Modern Rubber Chemistry," page 193, D. Van Nostrand Co., Inc., New York, N.Y., 1948.

MORRIS LIEBMAN, *Primary Examiner.*

LEON J. BERCOVITZ, K. B. CLARKE, *Examiners.*